Nov. 5, 1929.  K. CONRY  1,734,328
PIE RING
Filed Jan. 26, 1929
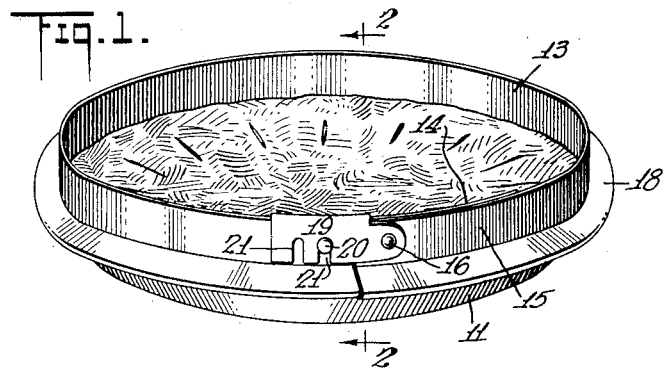
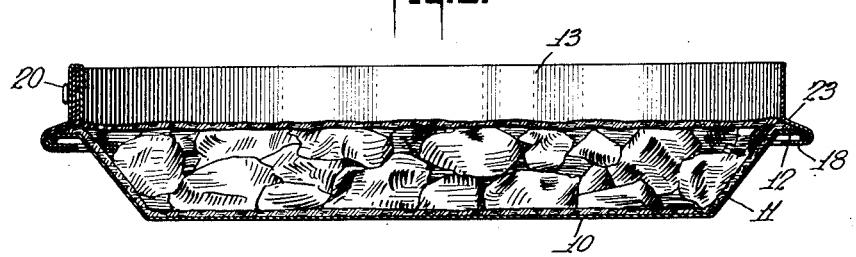
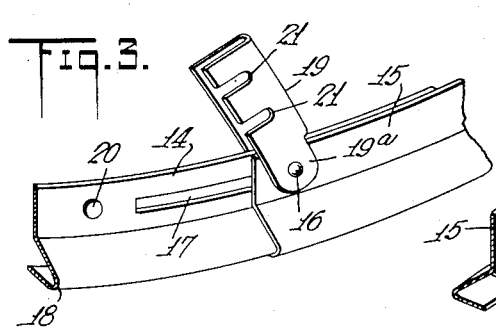
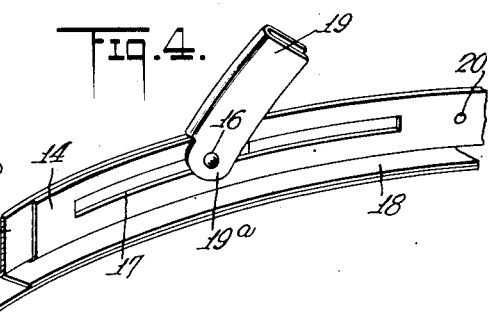
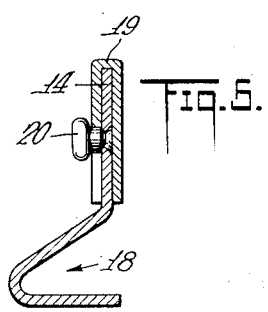
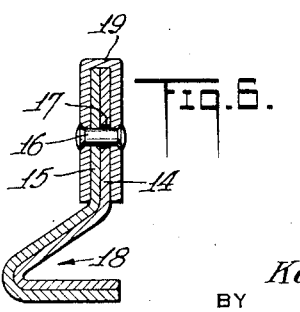
INVENTOR
*Kate Conry.*
BY
*Franklin J. Foster*
ATTORNEY Patented Nov. 5, 1929

1,734,328

UNITED STATES PATENT OFFICE

KATE CONRY, OF PHILADELPHIA, PENNSYLVANIA

PIE RING

Application filed January 26, 1929. Serial No. 335,194.

The present invention is concerned with the provision of a removable ring for attachment to a pie pan or the like to prevent the juice from the pie from running over the edge of the pan while the pie is cooking.

It is almost impossible for a housewife to successfully bake a full-sized fruit pie in an ordinary pan without a certain amount of juice boiling out of the pan and not only soiling the oven but creating an undesirable aroma of burning fruit.

Certain prior attempts have been made to overcome this difficulty by the provision of pan attachments, but all of the prior devices of which I am aware have been commercially unsuccessful for one reason or another, such, for instance, as difficulty of attachment and removal, incapacity for adjustment, leakiness, difficulty of cleaning and complexity and costliness of construction.

In accordance with the present invention I have provided a pie pan attachment of simple, practical, rugged, leak-proof construction, which may be applied and removed with expedition and facility and without bruising or burning the fingers. The device may, moreover, be conveniently washed and not only prevents soiling of the oven by the juice running over, but acts to improve the flavor of the pie by retaining the escaping juices on the pie crust and cooking them with the pie.

The invention may be more fully understood from the following description in connection with the accompanying drawings, wherein:

Fig. 1 is a perspective view showing my improved attachment in applied position on a pie pan.

Fig. 2 is a transverse sectional view on the line 2—2 of Fig. 1.

Fig. 3 is a perspective detail showing the ring latch released.

Fig. 4 is a similar view but taken from the opposite side of the ring.

Figs. 5 and 6 are sectional details through the latching mechanism of the ring on a somewhat enlarged scale.

In the drawings, a conventional type of pie pan is shown including the bottom 10, flaring side wall 11 and outwardly extending beaded flange 12 at the top of the side wall. The attachment includes a strip of thin, springy metal 13 of uniform width bent into ring form and with its ends 14 and 15 overlapped and slidably connected together as by a rivet 16 on the end 15 working in an elongated slot 17 in the end 14.

The upper or body portion of the ring 13 is adapted to define a vertical upstanding flange and near its lower edge the ring is pressed outwardly to define an inwardly facing V-shaped groove 18, the mouth of which is substantially flush with the flange portion of the ring. The bead of flange 12 is received snugly in the rounded bottom of groove 18 when the ring is in applied or operative position.

A swinging latch member 19 pivotally mounted on the rivet 16 is notched for coaction with an outwardly projecting keeper stud 20 on the ring end 14 to lock the spring ring against extension when in contracted applied position. Latch member 19 includes a length of metal slightly bent transversely into the general curvature of the ring and bent longitudinally upon itself to define an open-bottomed latch element of substantial U-shape in cross-section with its spaced plate portions adapted to straddle and embrace the overlapped ends 14 and 15 of the ring 13. The outer plate of the latch is provided with any suitable number of the notches 21 in its lower edge and any of these notches may conveniently receive the neck of headed stud 20 whereby the ring may be locked with its ends in various positions of overlapped adjustment, or in other words the ring diameter may be conveniently varied to suit different pan sizes.

The intermediate portion of member 19 is cut out at 19ª to permit limiting swinging movement of the latch without interference from the top of ring 13.

The length of the slot 17 is such that when the latch 19 is swung up as in the position of Fig. 3 the ring will by its own inherent springiness expand to a diameter which exceeds the diameter of the pan flange 12. The ring is then dropped over the flange 12 and the overlapped ends of the ring pulled together, using stud 21 and latch 19 as handles. The latch is then swung down to engage the keeper stud 20 with the desired notch 21 and locks the ring against expansion.

At this time the pan flange 12 will be snugly accommodated in the groove 18 and any juices escaping from the center of the pie and running toward the outer edge thereof will be effectively blocked by the upstanding portion of the ring 13. The slight V-shaped recess shown at 23, which is cooperatively defined by one wall of the groove 18 and by the upper face of the pan flange 12 ordinarily is filled with pastry and thus thoroughly sealed, so that there could be no leakage even though the ring and the pan were not accurately fitted together.

In practice the bottom crust is laid in the pan, the fruit applied and then the top crust applied, with both of the pastry elements overlying the flange 12. Preferably the edges of the crust are trimmed in the ordinary manner, but if desired the mere application of the ring 13 will either tend to remove the excess crust or to force it inwardly where it will snugly fill the groove 23.

To remove the ring from the pan it is merely necessary to lift the latch 19 upward and permit the ring to spring to its fully expanded position and drop down around the pan. This operation may be conveniently performed by a knife or any other suitable tool without burning the fingers.

It will thus be seen that there is herein described a device in which the several features of this invention are embodied, and which device in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

What I claim is:

1. A pie pan attachment including a length of spring metal bent into substantially ring form with its ends overlapping and slidably connected together, said ring defining an upstanding flange portion and therebelow being shaped to provide an inwardly facing groove adapted to receive the flange of a pie pan, a latch member of generally U-shape in cross section pivotally connected to one end of the ring straddling both ends thereof and coacting with keeper means on the other end of the ring to sustain the attachment in pan clamping position.

2. A pie pan attachment including a length of spring metal bent into substantially ring form with its ends overlapping and slidably connected together, said ring defining an upstanding flange portion and therebelow being shaped to provide an inwardly facing groove adapted to receive the flange of a pie pan, a latch member following transversely the general curvature of the ring, shaped to straddle the overlapped ends of the ring and pivoted near its end to one of them to swing in the plane of the ring, a keeper for the latch on the other end of the ring.

3. A pie pan attachment including a length of spring metal bent into substantially ring form with its ends overlapping and slidably connected together, said ring defining an upstanding flange portion and therebelow being shaped to provide an inwardly facing groove adapted to receive the flange of a pie pan, a latch member following transversely the general curvature of the ring, shaped to straddle the overlapped ends of the ring and pivoted near its end to one of them, a keeper for the latch on the other end of the ring, the means for slidably connecting the overlapped ring ends and for providing a pivotal support for the latch comprising a pivot pin on one ring end working in a slot in the other.

4. A pie pan attachment including a length of spring metal bent into substantially ring form with its ends overlapping and slidably connected together, said ring defining an upstanding flange portion and therebelow being shaped to provide an inwardly facing groove adapted to receive the flange of a pie pan, a latch member pivotally connected to one end of the ring and coacting with keeper means on the other end of the ring to sustain the attachment in pan clamping position, the latch comprising a sheet of metal bent on longitudinal lines to define a pan of spaced plate portions lying on opposite sides of the overlapped ring ends and an intermediate portion cut away at one end to provide clearance for limited pivotal movement of the latch.

5. A pie pan attachment including a length of spring metal bent into substantially ring form with its ends overlapping and slidably connected together, said ring defining an upstanding flange portion and therebelow being shaped to provide an inwardly facing groove adapted to receive the flange of a pie pan, a latch member pivotally connected to one end of the ring and coacting with keeper means on the other end of the ring to sustain the attachment in pan clamping position, the latch comprising a sheet of metal bent on longitudinal lines to define a pan of spaced plate portions lying on opposite sides of the overlapped ring ends and an intermediate portion cut away at one end to provide clearance for limited pivotal movement of the latch.

Signed at Philadelphia, in the county of Philadelphia and State of Pennsylvania, this 22nd day of January, A. D. 1929.

KATE CONRY.